United States Patent [19]

Brune

[11] 4,368,691
[45] Jan. 18, 1983

[54] FLOWING BED METHOD AND APPARATUS FOR CULTURING AQUATIC ORGANISMS

[75] Inventor: David E. Brune, Winters, Calif.

[73] Assignee: Regents of the University of California, Berkeley, Calif.

[21] Appl. No.: 240,556

[22] Filed: Mar. 4, 1981

[51] Int. Cl.³ .............................................. A01K 61/00
[52] U.S. Cl. ............................................. 119/2; 119/3
[58] Field of Search ....................................... 119/2, 3, 4

[56] References Cited

U.S. PATENT DOCUMENTS 3,661,119  5/1972  Sanders .................................... 119/2

FOREIGN PATENT DOCUMENTS

2018551  10/1979  United Kingdom ..................... 119/3

*Primary Examiner*—Hugh R. Chamblee
*Attorney, Agent, or Firm*—Phillips, Moore, Lempio & Finley

[57] ABSTRACT

A flow of loose solid particles (22, 22a, 22b) accumulates materials which are to be removed from a region (21, 22a, 21b) in which aquatic organisms are confined within a liquid medium (13, 13a, 13b). The particle flow may form a bed at the bottom of the organism containing region that receives waste materials and may also be utilized to scour the walls (16) of the culture vessel (11, 11a, 11b). The particle flow, which may be gravitationally induced, travels down an inclined inner surface (18, 18a, 102) of the culture vessel and out through a submerged outlet (51, 51a, 51b) while blocking escape of the organisms through the outlet. The particles are preferably cleaned and recirculated through the flow. While other usages are possible, the system is particularly adapted to the cultivation of herbivore zooplankton, such as brine shrimp for example, for protein production. High density biomasses of such organisms may be maintained without adverse effects heretofore encountered as a result of waste accumulation.

22 Claims, 7 Drawing Figures

FLOWING BED METHOD AND APPARATUS FOR CULTURING AQUATIC ORGANISMS

DESCRIPTION

TECHNICAL FIELD

This invention relates to aquiculture and more particularly to a method and apparatus for removing waste materials or other substances from a region in which aquatic organisms are confined.

BACKGROUND OF THE INVENTION

The photosynthetic activity of algae offers a potentially very productive source of food proteins and other valuable products if practical systems for high density cultivation can be devised. It has heretofore been recognized that yields may be increased and that certain practical problems may be resolved by cultivating herbivore zooplankton, such as brine shrimp for example, in conjunction with the algae. The zooplankton perform the harvesting function and in the process convert the product to high quality animal protein.

The economic viability of such systems is strongly dependent on the population of aquatic animals which can be maintained per unit volume in a liquid medium within cultivation tanks or the like. In the case of brine shrimp (Artemia salina) population densities of about 4,000 animals per liter have been maintained in small tanks with a high liquid flow through rate but such systems are subject to problems which must be resolved to enable practical use on a commercial scale.

For example prior systems of this kind have typically depended on fine mesh screens to confine the animal biomass while enabling a continuous flow through of the liquid medium and nutrients as is required for high density cultivation. Systems relying on screens for this purpose have not been suitable for economical large scale culture as the screens also tend to retain much of the waste materials produced by the animals. Clogging of the screens may occur very rapidly. Trapped waste materials produce a variety of adverse effects including reducing the flow through of liquid, acceleration of ammonia production and depletion of dissolved oxygen.

Materials which can adversely affect a culture and which should be removed are not limited to waste matter produced by confined animals. In the culture of algae, undesirable competitor species or even predator species or organisms may proliferate under certain conditions. Growth of a population of such unwanted organisms tends to be promoted if the organisms are allowed to colonize the inner walls of the cultivation tank. Maintenance of the desired culture of algae may require removal of accumulated substances from the walls of the culture vessel.

Accordingly, effective large scale utilization of algae-zooplankton cultures for the above described purposes requires methods and suitable apparatus for quickly and more efficiently removing waste materials and the like from a confined high density biomass. This should preferably be accomplished on a continuous basis and should not require sizable structural complications of the culture apparatus nor substantial complication of maintenance and operating procedures.

While the problems addressed by the present invention have been discussed above with reference to large scale algae-brine shrimp culture, essentially similar problems from the accumulation of unwanted materials are encountered in some aquariums or other containment systems in which other kinds of aquatic organism are maintained in a liquid environment. The cultivation of oyster larvae for example has been impeded by the above discussed problems inherent in prior techniques and apparatus for the elimination of waste products and the like.

One common prior method for avoiding waste accumulation problems while confining an aquatic animal biomass is the sub-gravel filter as typically employed in small aquariums. In such systems an air-water pump draws water and waste material into a fixed bed of sand or gravel where the material is eventually mineralized to harmless end products. This technique is effective only where the rate of waste generation is relatively small in comparison to that of a high population density system of the kind discussed above. Where higher rates of waste generation are present, known counteractive procedures typically require large and costly filter systems which must be frequently cleaned or changed and which are adversely affected by clogging in the interim. In some prior systems, periodic shifting of the animal population from one container to another may be required which procedure dictates structural complications, adds substantial costs and may adversely affect the health and productivity of the animals.

The present invention is directed to overcoming one or more of the problems as set forth above.

SUMMARY OF THE INVENTION

In one aspect of the present invention aquatic organisms are cultured by a method which includes the steps of confining the organisms to a predetermined region in a liquid medium and providing a volume of loose solid particles at a boundary of the region in position to accumulate matter which is to be removed from the region. The method includes the further step of removing the matter from the region by causing the volume of particles to flow between a first location and a second spaced apart location and by directing the flow of particles and accumulated matter out of the region at the second location.

In another aspect the method of this invention includes the further steps of separating the accumulated matter from the particles at a location outside of the organism containment region and returning the particles to the region for repeated movement between the first and second locations.

In one specific aspect of the method of the invention, the flow of particles is directed down an inclined floor surface between the first and second locations and is utilized to remove waste materials that are produced by the aquatic organisms and which drop to the bottom of the region.

In another specific aspect of the method of the invention, the flowing volume of particles is directed down an inclined wall of the culture vessel and is utilized to scour the wall.

In another aspect the invention provides aquicultural apparatus having a vessel with internal surfaces defining a region in which aquatic organisms are cultured within a liquid medium and in which a volume of loose solid particles is situated on an internal surface in the vessel in position to accumulate material which is to be removed from the region. The apparatus further includes flow producing means for causing flowing movement of the volume of particles and accumulated material between a first location in the region and a second spaced apart location, and outlet means for directing the particles and accumulated material out of the region at the second location.

In another aspect of the invention the apparatus further includes means for separating the accumulated material from the particles and recirculation means for transmitting particles from the second location to the separator means and then back to the first location.

In one specific aspect of the apparatus of this invention, the flowing volume of particles is a bed of particles on a floor member of the organism containment region and is positioned to received waste materials produced by the organisms that drop to the bottom of the region.

In another specific aspect of the apparatus of this invention the particles flow along a wall of the culture vessel and exert a scouring action on the wall.

By flowing a mass of loose particles along a boundary of a region in which aquatic organisms are cultured with the particles then being directed out of the region and preferably being cleaned and recirculated through the flow, a highly efficient and reliable elimination of waste materials or the like is accomplished. The particle flow may variously be used to establish a submerged moving bed at the bottom of the organism containment region or may be used to clean one or more walls within the culture vessel or may in some cases serve both purposes within a single culture vessel. In a preferred form of the invention, the flowing particles and accumulated materials flow out of the containment region through a submerged outlet, escape of the organisms through the outlet being blocked by the particle mass which fills the outlet opening. Consequently, screens are not necessarily required for the purpose of confining the organisms and thus clogging problems are avoided. A high rate of liquid flow through the culture region may readily be established and maintained. The above discussed adverse effects of waste accumulation on the organisms and on the culturing system are greatly reduced and maintenance problems are simplified. High population densities of the organisms may be maintained for prolonged periods where that is desirable such as in the culturing of algae and herbivore zooplankton for protein production.

The invention together with further objects and advantages thereof may be further understood by reference to the accompanying drawings and the following description of detailed examples.

DETAILED DESCRIPTION OF EMBODIMENTS OF THE INVENTION

Figure 1:
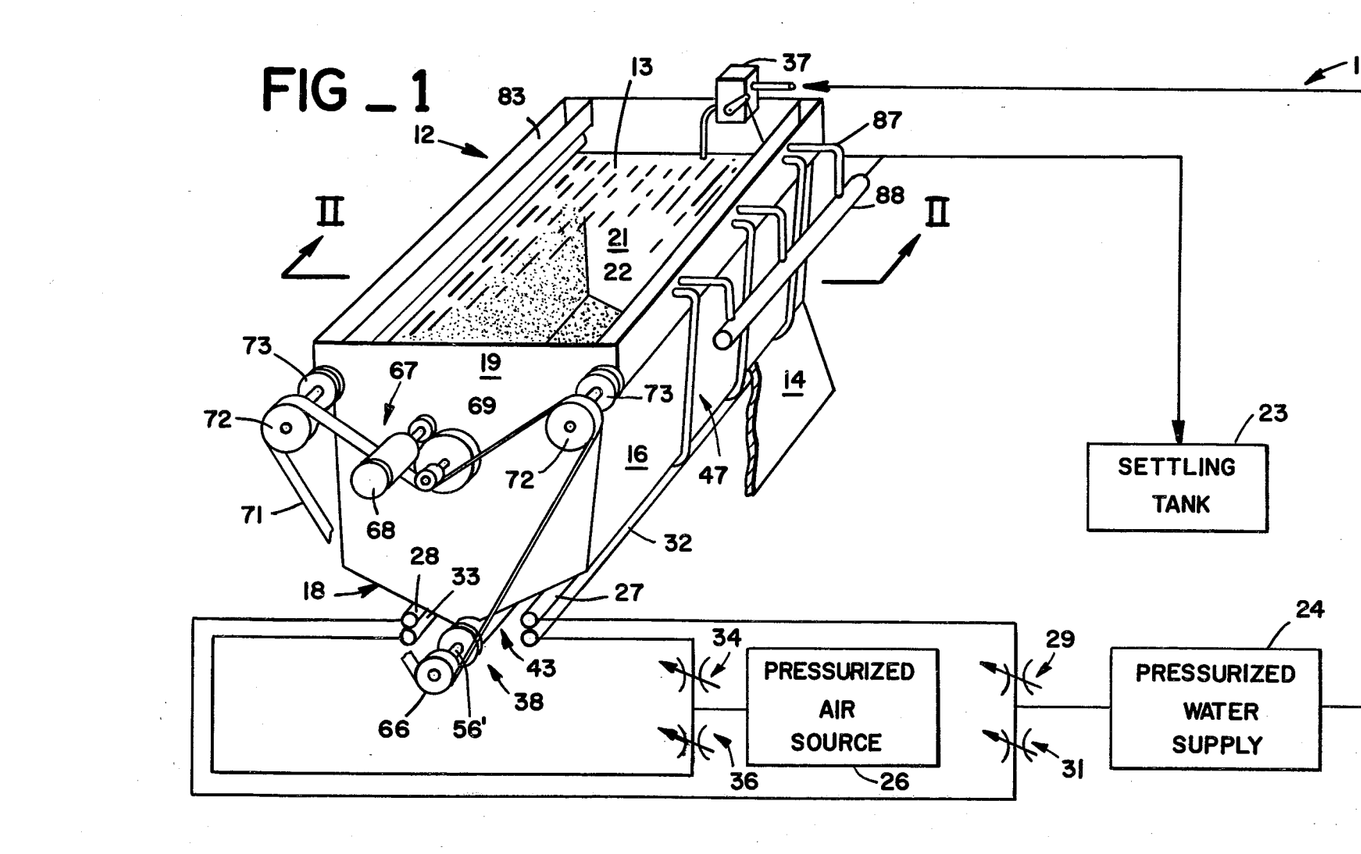
FIG. 1 is a partially schematic perspective view of a culture tank or reactor for aquatic organisms in accordance with one embodiment of the invention.

Referring initially to FIG. 1 of the drawings, an aquicultural system 11 for culturing aquatic organisms includes a vessel or reactor 12 containing a liquid medium 13. Where, as in this particular example, the organisms are adult brine shrimp the liquid medium 13 may be sea water or any of the various synthetic sea water compositions known to the art. While the vessel 12 of this example is depicted as a free standing tank resting on a suitable support 14 and having sidewalls 16, a floor 18 and endwalls 19 of sufficient structural strength to support the volume of liquid 13, usage of the invention is not limited to such free standing structures. In many instances, particularly in large high capacity installations, the vessel 12 may be essentially defined by an excavation in the ground and in which one or more of the walls 16 and 19 and floor 18 are more simply and economically formed by sheets of flexible plastic material lining the excavation.

The interior of the reactor vessel 12, below the surface of liquid 13, constitutes a containment region 21 for the aquatic organisms and a volume of loose solid particles 22 is provided at the bottom of the region on the inner surface of floor 18 in position to receive waste materials that are produced by the organisms and which drop to the bottom of the region.

For purposes to be hereinafter discussed in more detail, the system 11 includes a settling tank 23 which receives a flow of liquid and suspended particulate waste materials from the vessel 12, a pressurized water supply 24 and a pressurized air source 26, which components may be of known form and therefore are depicted only schematically in FIG. 1. Water supply 24 is communicated with a first water manifold conduit 27 and a second water manifold conduit 28 through separate flow control valves 29 and 31 respectively and the conduits 27 and 28 extend longitudinally beneath vessel 12 at opposite sides of the center of the vessel. Similarly, air source 26 is connected to first and second air manifold conduits 32 and 33 through separate flow control valves 34 and 36, the air manifold conduits 32 and 33 also being below floor 18 and at opposite sides of the center of the vessel 12. To maintain the level of liquid 13, a float controlled valve 37 is connected to water supply 24 and is secured to the rim of the vessel 12 to supply additional water when the liquid level drops below the desired height.

Particle flow producing means 38 provide for a continuous removal of waste materials from the organism containment region 21 while providing for a high rate of flow through of liquid 13 and while also blocking the escape of organisms. In this example, the particle flow also effects a continuous cleaning or scouring of the inner surfaces of vessel walls 16. For these purposes, means 38 continuously flows the particles 22 down the inner surfaces of sidewalls 16 and then across the floor 18 surface and then out of the vessel 12 at the longitudinal centerline of the floor.

Figures 2, 3:
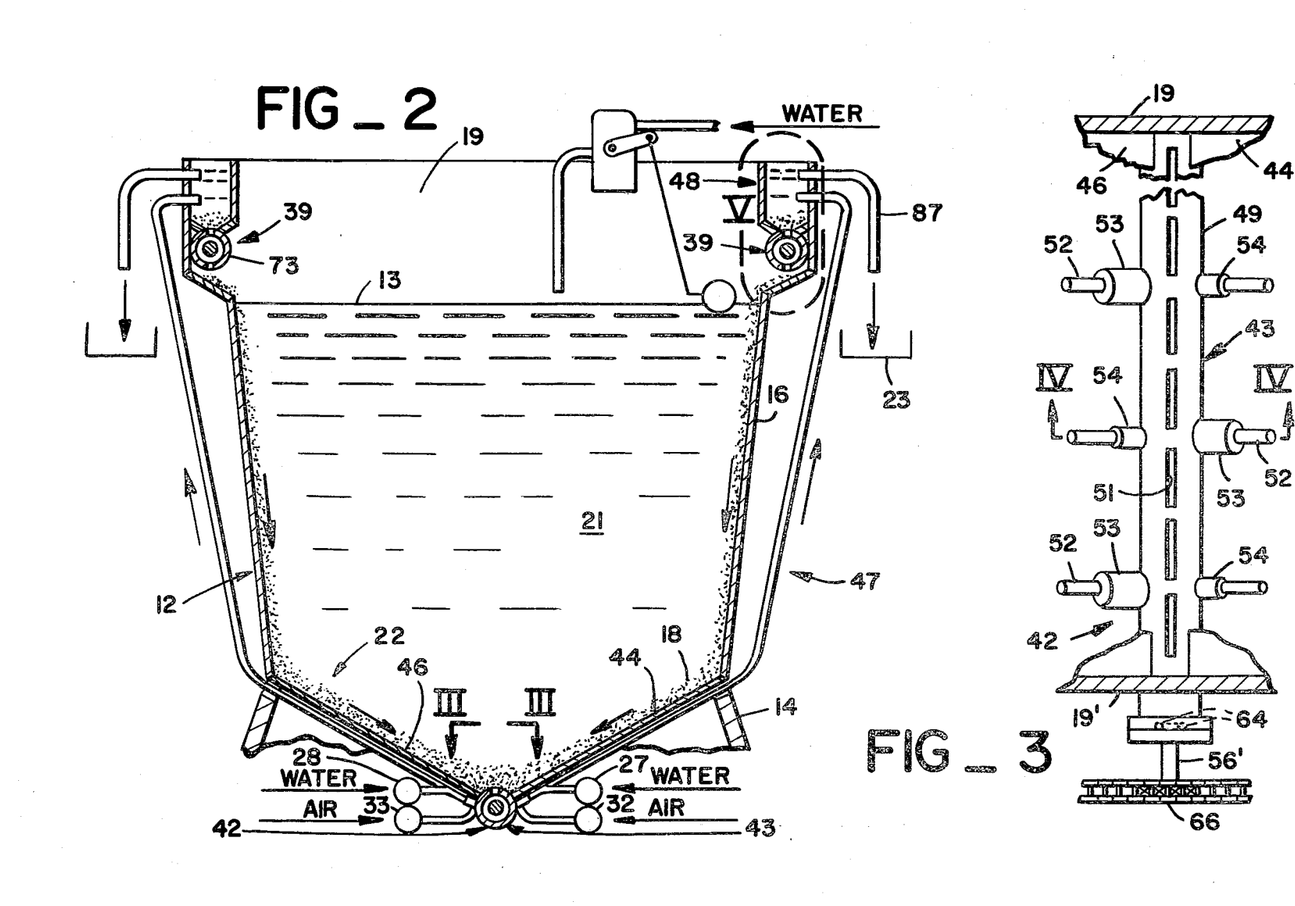
FIG. 2 is a cross section view of the apparatus of FIG. 1 taken along line II—II thereof.
FIG. 3 is a foreshortened broken out plan view of a component of the apparatus of FIG. 2 taken along line III—III thereof.

More specifically, with reference now to FIG. 2, particle inlet means 39 are provided above each sidewall 16 for releasing particles onto the inner surfaces of the sidewalls at a predetermined rate to cause a continuous gravitationally induced flow of the particles down the inner surface of each sidewall 16. The cleaning or scouring action of the particle flow of the sidewalls is enhanced if the inner surfaces of the sidewall members 16 are slightly convergent in the downward direction the sidewalls 16 being inclined at an angle of 5° from vertical in this particular example.

Particle flow outlet means 42 includes a first tubular particle translating device 43, to be hereinafter described in more detail, which extends longitudinally along the bottom of vessel 12 below the sidewalls 16 in parallel relationship to the sidewalls and at a location midway between the sidewalls. The vessel floor 18 is formed by first and second inclined flat floor members 44 and 46 which extend outwardly and upwardly from the first translating device 33 to the lower edges of sidewall 16. Each such floor member 44 and 46 is inclined at an angle, of 30° relative to horizontal in this particular embodiment, that at least slightly exceeds the angle of repose of the particles 22 in the liquid medium 13. Consequently, the particle bed defined by the portion of the particles 22 which are on floor 18 at any given time flows continuously downward along the inner sufaces of floor members 44 and 46 to the particle outlet means 42. The angle of repose may vary in different embodiments of the invention, as it depends on the characteristics of the particular particles 22 which are used and on the lubricating properties of the liquid medium 13, but can readily be determined experimentally for any given system.

Owing to the lesser inclination of the floor members 44 and 46 relative to the inclination of sidewalls 16, the flow of particles 22 along the floor is slower than the flow along the sidewalls. Thus while the flow along the sidewalls may be a discontinuous rapidly moving curtain, the slower flow along the floor 18 causes the particles to form a relatively thick bed at the bottom of the organism containment region 21, the bed being in position to receive waste materials produced by the organisms that drop to the bottom of the region. The flowing action tends to entrain such materials within the particle bed so that such materials are also carried to the outlet means 42.

While the flow of particles 22 and accumulated material is directed out of the region 21 at outlet means 42, the organisms are effectively confined to the region since the particle mass covers the outlet means to block escape of the organisms.

At least in most cases, it is desirable for economic reasons to provide recirculation means 47 for returning the particles 22 from outlet means 42 to the inlet means 39 for repetitive movement through the flowing bed of particles, cleaning or separator means 48 also being provided to separate accumulated waste materials from the particle flow prior to recirculation through the vessel 12.

Referring now to FIG. 3 in conjunction with FIG. 2, the first particle translating device 43 of outlet means 42 in this example includes a cylindrical tube 49 extending between endwalls 19 between the lower edges of floor members 44 and 46. The upper portion of tube 42 fits between the two floor members 44 and 46 and is secured to each such member by welding or other means which forms a liquid tight junction. A series of aligned longitudinal slots 51 along the top of tube 49 between floor members 44 and 46 constitute particle outlet openings through which the following particles 22 enter the translating device 43.

Particles which enter the tube 49 through slots 51 are discharged through a series of recirculation flow conduits 52 which have intake ends communicated with the interior of the tube through fittings 53 situated at spaced apart intervals along the length of the device 43. Alternate ones of the fittings 53 are at opposite sides of the tube 49 so that alternate ones of the recirculation flow conduits 52 may extend upwardly and outwardly in opposite directions from the tube. The conduits 52 which extend from each side of tube 49 have discharge ends communicated with the separator means 48 at the same side of the vessel 12.

Particles are pumped out of tube 49 and up through recirculation flow conduits 52 by a fluid pumping action produced by a combination of water flow and air flow. For this purpose an additional series of fittings 54 are provided on cylinder 49 with alternate ones of the additional fittings also being at opposite sides of the cylinder. Each such additional fitting 54 is communicated with the water manifold conduit 27 or 28, shown in FIG. 1, at the corresponding side of the translating device 43. Thus, with reference to FIGS. 3 and 4 in conjunction, the additional fittings 54 provide for a flow of pressurized water into each side of tube 49 at intervals along the length of the tube.

Figure 4:
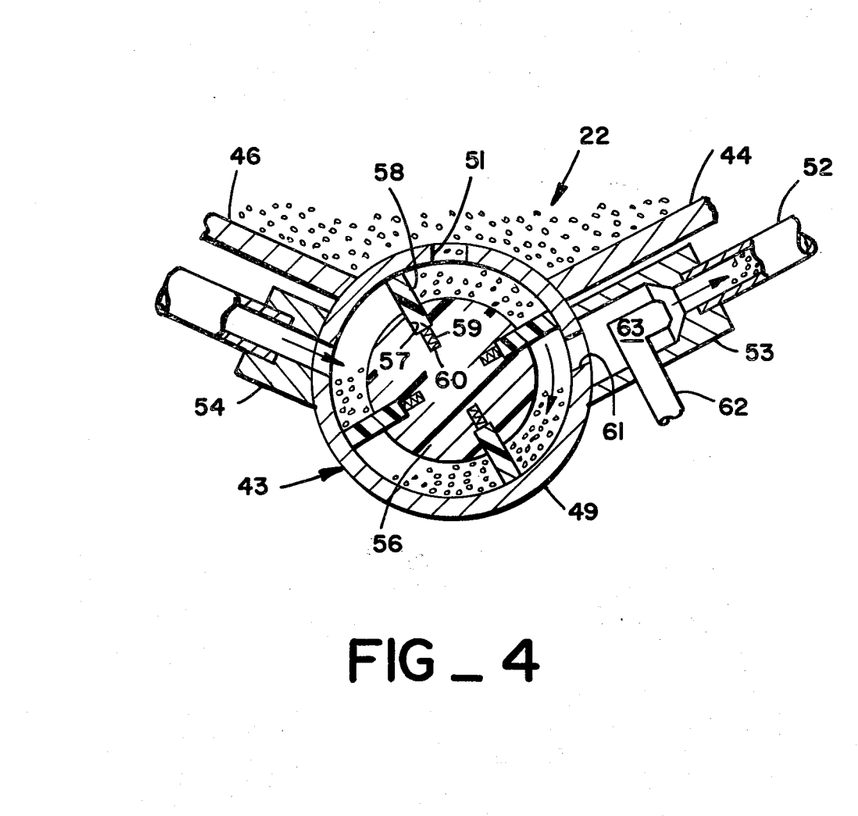
FIG. 4 is a cross section view taken along line IV—IV of FIG. 3.

A rotatable spool 56 of circular cross section extends coaxially within tube 49 and has a diameter smaller than the inside diameter of the tube. Four linear slots 57 are provided in spool 56, the slots being radially directed and equiangularly spaced apart relative to the rotational axis of the spool. Each of four slat shaped vanes 58 has an inner edge received in a separate one of the slots 57 and each such vane extends outwardly to contact the inner surface of tube 49. A series of small coil springs 59 are disposed in radially directed wells 60 at intervals along the length of the spool 56 in position to urge the vanes 58 outward against the inner surface of tube 49.

As the spool 56 revolves, clockwise in this example as viewed in FIG. 4, the region between adjacent ones of the vanes 58 fills with particles 22 which are received through the slot openings 51 of tube 49. The vane 58 movement then carries such particles 22 around to a position adjacent openings 61 which are provided in tube 49 to communicate the interior of the tube with the fittings 53 which are at the side of the tube that is below floor member 44. At this position of the spool 56, the water flow along that side of the spool carries a portion of such particles 22 into fittings 53 through the opening 61 and then up through the associated ones of the recirculation flow conduits 52 at that side of the tube 49. Referring again to FIG. 3, it should be noted that the water flow directed into tube 49 through inlet fittings 54 at each side of the tube 49 travels longitudinally along the tube between adjacent ones of the vanes 58 and then out through the ones of the outlet fittings 53 which are at the same side of the tube.

Referring again to FIG. 4, the particle pumping action of the water flow out of tube 49 is supplemented by an air lift pumping action. In particular, an air tube 62 extends into each outlet fitting 53 to an air flow emitting nozzle 63 within the fitting which is directed into the associated air recirculation conduit 52. Tubes 62 connect with the air manifold conduit 32 or 33, shown in FIG. 1, at the corresponding side of translating device 43. Referring again to FIG. 4, the particle pumping action of the water flow through the fittings 53 is thus enhanced by an air pump effect. In addition, the air flow from nozzles 63 provides further beneficial effects. For example if the water flow alone is relied on to pump particles 22 out of tube 49 and up through recirculation flow conduits 52, then the water flow into the tube through fittings 54 must have a higher pressure than the hydrostatic head pressure produced by the liquid volume within vessel 12. This may cause an upward leakage flow of the high pressure water past vanes 58 and into the organism region 21 through the particle outlet openings 51. A leakage flow of this kind is usually undesirable as it opposes the outflow of particles and liquid through openings 51 and can cause an upwelling of waste material back into the containment region. The jet pumping action of the air nozzles 63 may be adjusted to reduce the fluid pressure within the side regions of tube 49 to a value below that of the hydrostatic head pressure at openings 51 thereby avoiding any significant leakage upflow of water of the kind discussed above. The air flow also serves to facilitate separation of waste material from the particles 22 as will hereinafter be described in more detail.

The air-water pumping action at the side of tube 49 below the first floor member 44 removes only a portion of the particles 22 that are entrapped between the rotating vanes 58 traveling down that side of the cylinder. The remainder of such trapped particles 22 is carried around to the other side of the tube 49 by the vane 58 motion where, with reference again to FIG. 3, another portion of the trapped particles is pumped out through the outlet fittings 53 and recirculation flow conduits 52 at the opposite side of the tube in an essentially similar manner.

The proportion of the particles 22 carried between vanes 58 that is pumped into the recirculation flow conduits 52 that extend rightwardly as viewed in FIG. 3 may be selected and controlled by adjustment of the water flow valve 29 and air flow valve 34 depicted in FIG. 1. The proportion of the particles 22 that is pumped out at the opposite side of the tube 49 may be similarly controlled by adjustment of the other water flow control valve 31 and the other air flow control valve 36. At least in most cases, the particle 22 flow rates out of the opposite sides of the tube 49 are equalized by adjustment of the several valves 29, 31, 34 and 36 so that the flow of particles down the two opposite sides 16 and along the oppositely inclined portions of floor 18 are equalized.

Referring to FIGS. 3 and 4 in conjunction, tube 49 extends a small distance outwardly from one of the endwalls 19' of the vessel and the spool 56 within the tube has a reduced diameter end portion 56' which extends out of the end of the cylinder through a suitable water tight seal 64 to connect with a drive gear 66. Referring again to FIG. 1, the drive means 67 for the particle translating device 38 in this example includes an electrical motor 68 coupled to drive gear 66 through speed reduction gearing 69 and a drive chain 71.

Figure 5:
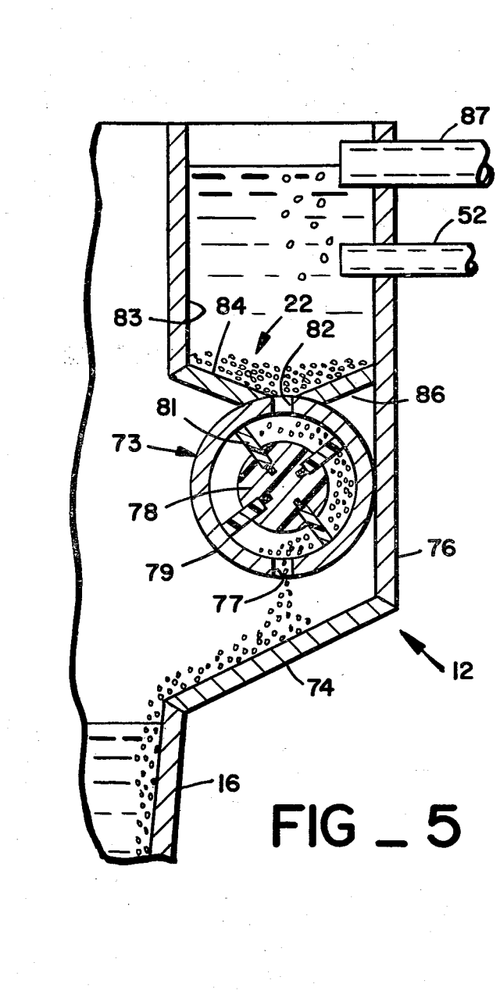
FIG. 5 is an enlarged view of the portion of FIG. 2 encircled by dashed line V thereon.

Through gearing 69 and chain 71, the motor 68 also turns a pair of drive gears 72 of a pair of second particle translating devices 73 each of which extends along an opposite side of the vessel 12 above the sidewall 16 of the corresponding side of the vessel 12. With reference to FIG. 5, at each side of vessel 12 an upwardly inclined shelf 74 extends outwardly from the upper edge of the sidewall 16 to the lower edge of a side panel member 76. One of the second particle translating devices 73 is situated adjacent each side panel member 76 and is spaced a small distance above the inclined shelf 74. The particle translating devices 73 are essentially similar to the previously described first translating device 43 of the outlet means, as depicted in FIGS. 3 and 4, except for the absence of pressurized water and air flow fittings 52 and 53 as used at the first particle translating device and except insofar as a series of aligned particle outlet slots 77 are provided along the bottom of the second particle translating device 73 as depicted in FIG. 5. Thus, with reference again to FIG. 5, the second particle translating devices 73 each include a rotatable spool 78 disposed coaxially within a tube 79 which is of greater diameter than the spool. The spool 78 carries four equiangularly spaced apart radially directed spring loaded vanes 81 in the manner previously described and a series of aligned particle inlet slots 82 are provided along the top of the tube 79.

A separator compartment 83 is situated above each translating device 73 to feed particles 22 into the inlet passages 82 of the translating device, the compartment being formed by a partition 84 spaced apart from side panel 76 and by inclined bottom panels 84 and 86 which slant down to tube 79 from partition 84 and side panel 76 respectively. Particles 22 are delivered to the separator compartment 83 by the recirculation flow conduits 52, the discharge ends of which extend into the compartment through side panel 76 at an intermediate level within the compartment. Overflow drain conduits 87 also extend into the separator compartment 83 through side panel 76 but at a level above that of the recirculation flow conduits 52. Referring again to FIG. 1, the overflow drain conduits 87 communicate with a gravity drain line 88 to settling tank 23.

Given the configuration of this embodiment of the invention, each single one of the particle translating devices 73 of the particle inlet means 39 translates particles 22 at approximately one half of the rate that the first translating device 33 of the outlet means does so. If, as in this example, all three particle translating means 43 and 73 are of equal proportions and basically similar construction, the second particle translating devices 73 may be driven at a slower rotational speed than the first particle translating device 43. Where all three such devices 43, 73 are driven by the same motor 68 this may be provided for by using drive gears 72 for the second translating devices 73 that have a larger diameter than the drive gear 66 of first translating device 43.

Referring again to FIG. 2, it is advantageous if the inlet translating devices 73, considered jointly, are capable of feeding particles 22 into region 21 at a rate greater than the particles are removed by the outlet translating device 43. This may be arranged for by an appropriate relative sizing of the drive gears 73 and 66 or other components of the devices such as the particle inlet and outlet openings. While each of the two inlet devices 73 basically translates particle 22 at one half of the rate that the particles are passed through the outlet device 43, in practice there may be some imbalance in the division of the particle flow at the outlet device. Further, some temporary unevenness in the bulk of particles 22 at particular positions along the particle flow path may tend to arise at times from any of various causes. This may come about from variations in the water or air flow pressures, clumping of portions of the particle flow from the effects of accumulated foreign material or for other reasons. The greater particle translating capacity of the inlet devices 73 acts to assure that if a localized temporary increase in the bulk of the particle flow occurs at some point it is at the region immediately above the outlet means 42. Thus the compensating temporary localized depletion in the bulk of the particle flow occurs somewhere else and does not create an opportunity for the organisms to escape from the containment region 21 through the outlet means 42.

The greater particle translating capacity of devices 73 also prevents a gradual build up of particles within one or both of the separator compartments 83 and thus a corresponding depletion of the bed of particles 22 within the vessel 12 such as could occur if the devices 73, considered jointly, were designed to have a translating capacity precisely equal to that of device 43 but actually exhibited a slightly smaller translating capacity.

Assurance that the volume of particles 22 in the region immediately above the outlet means 42 will not be depleted from causes of the kind discussed above may also be provided for by feeding a small continuous flow of additional new particles into the vessel 12 but this has the disadvantage that the effective volume of the organism containment region 21 is gradually decreased over a period of time.

In operation, with reference initially to FIG. 1, vessel 12 is filled with the liquid medium 13 and drive motor 68 is actuated to initiate the flow of particles 22 down the inner surfaces of sidewall 16 and then along the inner surface of floor 18 to outlet means 38. Water flow control valves 29 and 31 and air valves 34 and 36 are adjusted to cause the recirculation means 47 to return particles from the outlet means 38 to the separator compartments 83 at the top of each sidewall 16 at a rate sufficient to maintain the desired particle flow within the vessel 12 and also, to equalize the particle flows into the two separator compartments.

The organisms to be cultured may then be introduced into the containment region 21. Although in the culture of many species, such as brine shrimp for example, the submerged outlet openings at the outlet means 32 may be larger than the individual animals, escape of the organisms is prevented by the mass of particles 22 which blocks the outlet openings and covers the region immediately above the outlet means.

Referring again to FIG. 2, the particles 22 released through the translating devices 73 of the inlet means 39 drop rapidly down the inner surfaces of the sidewalls 16 and in the process exert a scouring action which keeps the walls clean and free of unwanted growth such as weed species of algae, wall dwelling competitive or predator species and the like. Owing to the lesser inclination of the floor members 44 and 46, the particle flow travels more slowly along the floor of the vessel 12 and thus forms a relatively thick flowing bed which is in position to receive and accumulate waste materials that are produced by the organisms and which drop to the bottom of the containment region 21.

The materials accumulated by the flow of particles 22 are carried out of the region 21 into the translating device 43 of the outlet means 38. The previously described air water lift action within the recirculation means 47 returns a slurry of the particles 22 and waste materials to the separator compartments 83. Within the separator compartments 83, the relatively heavy particles 22 drop to the bottom of the compartment and subsequently re-enter the associated one of the particle translating devices 73 while the lighter waste materials are carried upwardly by the upward flows of air and water in the upper regions of the compartments. The waste materials then enter drain conduits 87 and are removed to settling tank 23 by gravity flow. Thus the flow of particles 22 is continually cleaned of waste materials in the course of recirculation.

In addition to a quick and continuous removal of unwanted materials from the organism culture, the system also inherently provides for a very high flow through rate of liquid medium where that is desirable. Liquid is continuously withdrawn through the outlet means 38 along with the flowing particles and a flow of new or reprocessed liquid from water manifold conduits 27 is continuously directed into recirculation conduits 32 at the outlet means translating device 43 in the manner previously described. A portion of such flow of new water is then returned to the containment region through separator compartments 83 and the particle inlet translating devices 39, the remaining part of the flow being drained to settling tank 23.

By quickly and efficiently removing waste materials and the like while effectively confining the organisms and while enabling a high flow through of fresh liquid and nutrients, the system 11 provides for cultivation of very high population densities where that is desirable.

Figure 6:
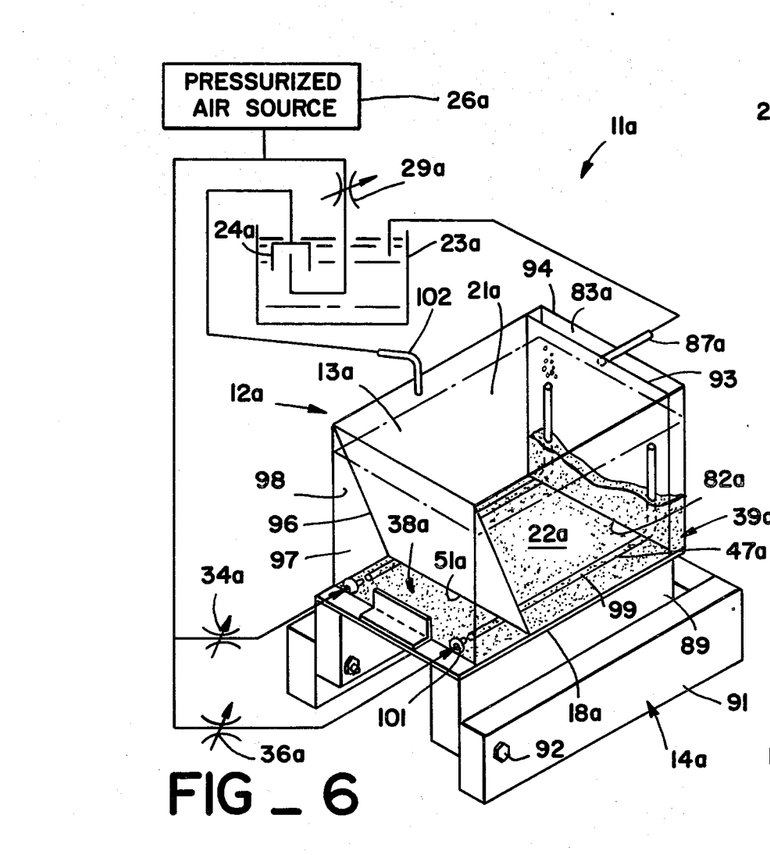
FIG. 6 is a perspective view of a culture system for aquatic organisms in accordance with a second embodiment of the invention.

Aspects of the invention may readily be adapted to culture vessels having different configurations and which utilize a different arrangement of components for establishing and maintaining the particle flow. FIG. 6, for example, depicts another aquicultural apparatus 11a having a vessel 12a of rectangular configuration and in which a bed of particles 22a flows along a tilted flat floor 18a at the base of the organism containment region 21a. The vessel 12a is secured to an adjustable support 14a which enables the vessel including the floor 18a to be inclined at a selected angle. Support 14a includes a tiltable member 89 coupled to a base member 91 through pivot means, bolts 92 in this example, which may be tightened to hold the vessel at the selected inclination.

A vertically extending first baffle 93 is situated a small distance from one end member 94 of the vessel 12a to form a separator compartment 83a at that end of the vessel. The lower edge of baffle 93 is spaced a distance above the floor member 18a to define a particle inlet opening 82a. A second baffle member 96 slants downward from the opposite end member 97 of vessel 12a to form a particle outlet compartment 98 adjacent end member 97, baffle 96 also having a lower edge spaced above floor member 18a to define a particle outlet opening 51a. Provided that the inclination of the vessel 12a is selected to exceed the angle of repose of the particles 12a in the liquid 13a, particles 22a from separator compartment 83a flow under baffle 93 and then down floor member 18a to baffle 96 where the particle flow slumps under baffle 96 and enters the outlet compartment 98.

Particle recirculation means 47a in this example includes a pair of spaced apart tubes 99 which extend between the inlet and outlet compartments 83a and 98 within the flowing bed of particles 22a. Air nozzles 101 within the outlet compartment 98 are positioned to direct a flow of compressed air into the ends of tubes 99. The air flow entrains a slurry of particles and liquid which is returned to the separator compartment 83a through tubes 99. Nozzles 101 receive pressurized air from a suitable source 26a through separate air flow control valves 34a and 36a which may be adjusted to control the rate at which particles 22a are returned to separator compartment 83a.

The tubes 99 are angled upwardly within inlet compartment 83a and extend to a level which is between the top of the particle 22a volume within the inlet compartment and the surface of the liquid 13a, the liquid surface level being established by a gravity drain line 87a which extends through endwall member 94 and which is communicated with a settling tank 23a.

The above described structure removes accumulated waste materials from the flow of particles 22a during the course of recirculation since the relatively heavy particles emitted from tubes 99 within separator compartment 83a drop to the bottom of the compartment while the relatively light waste materials are carried upward and out through drain line 87a by the upward flows of water and air in the upper portion of the separator compartment.

A continuous flow of water through the organism containment region 21a is provided for, in this embodiment of the invention, by another air lift pump 24a which directs clean liquid from the upper portion of settling tank 23a back to the vessel 12a through a water feed line 102, the rate of the inflow into the tank through line 102 being controllable by a valve 29a connected between air lift pump 24a and air source 26a.

In the operation of the embodiment of the invention depicted in FIG. 6, organisms to be cultured are situated in the confinement region 21a between baffles 93 and 96. Air lift pump 24a is actuated by opening valve 29a to deliver a continuous flow of liquid into the confinement region from settling tank 23a. Air flow control valves 34a and 36a are also opened to cause a slurry of particles and water to be pumped from outlet compartment 98 back to separator compartment 83a. Owing to the inclination of the vessel 12a including floor 18a, particles from the separator compartment 83a flow under baffle 93, along the floor, and under baffle 96 to the outlet compartment 98.

As the flowing bed of particles 22a fills both the inlet opening 82a below baffle 93 and the outlet opening 51a below baffle 96, escape of the organisms from region 21a is blocked. Particulate waste produced by the organisms is entrained in the flowing bed of particles 22a below the confinement region 21a and is carried into outlet compartment 98. The wastes are then carried to separator compartment 83a by the flow of particles and fluid through recirculation tubes 99. Within the separator compartment 83a, the outflow of fluid through drain conduit 87a carries the waste materials to settling tank 23a.

In one specific example of an aquicultural system 11a of the form depicted in FIG. 6, the vessel 12a measured 20.3 cm. wide in a direction transverse to the travel of the bed of particles 22a while being 30.5 cm. in both height and length. The particles 22a were spherical glass micro beads, of a type sold commercially for use in sandblasting operations, having sizes in the range from 500 to 710 microns. Recirculation tubes 99 had an inside diameter of 0.95 cm. The vessel 12a was filled with synthetic seawater mixture and particles 22a were added in an amount sufficient to form a bed of particles on floor 18a having a depth of 1.9 cm. which was the height of the inlet and outlet openings 82a and 51a. A quantity of additional particles 22a were added to separator compartment 83a. By adjustment of support 14a, the vessel 12a was then inclined until the particles 22a were observed to begin to flow towards outlet compartment 98, the angle of inclination in this particular example being found to be 30°. Air flow control valves 34a and 36a were adjusted to return particles from outlet compartment 98 to separator compartment 83a at the same rate that the particles traveled down floor 18a.

The confinement region 21a was then loaded with 8,000 adult brine shrimp (Artemia salina) per liter. Air lift pump 24a was actuated to deliver water into the vessel 12a at a rate sufficient to give a hydraulic retention time of about 8 hours. The system was operated for a period of 72 hours during which the particle travel time from inlet opening 82a to outlet opening 51a was approximately 30 minutes. Waste was continuously removed from the vessel 12a and delivered to settling tank 23a while confinement of the healthy adult brine shrimp was complete. The only adult animals which were entrained by the flowing bed of particles 22a and carried into the settling tank 23a were those which had been damaged in handling. These dead and dying animals were effectively removed from the culture by the flowing bed action. The example of the invention described above did not confine the nauplii or brine shrimp larvae generated by the adult culture. Following the operational period, a high density of nauplii were found to be swarming in the settling tank 23a. This effect provides a method for automatically and continuously separating nauplii from a brine shrimp food stock where that is desired.

Figure 7:
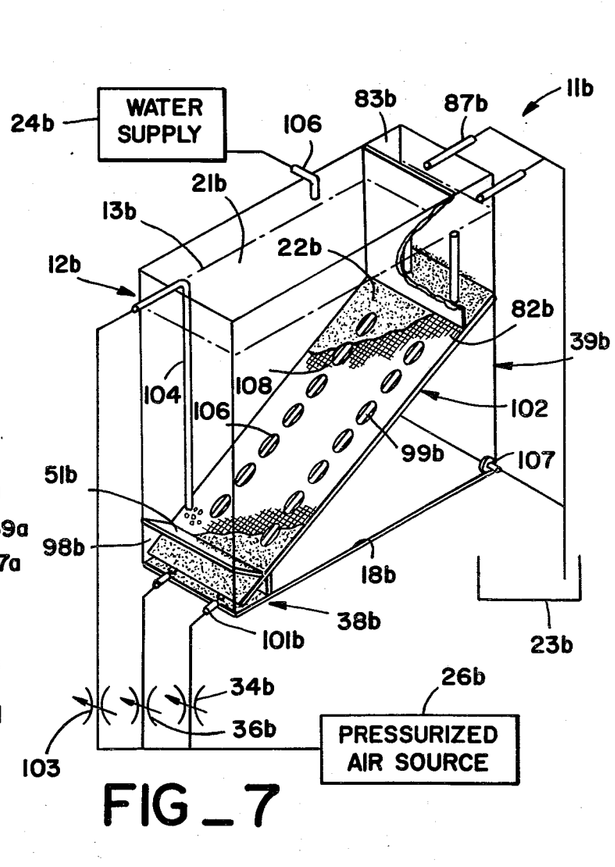
FIG. 7 is a perspective view of a culture tank for aquatic organisms in accordance with a third embodiment of the invention.

It is also possible to retain nauplii separately or with an adult population. While this might be accomplished by using a flowing bed composed of very minute particles in a system otherwise similar to that described above, such small particles also reduce the flow rate of liquid through the system in a manner which may be undesirable in some instances. FIG. 7 depicts still another embodiment 11b of the invention which retains nauplii while also providing for a very high rate of flow through of liquid and nutrients. The embodiment of the invention shown in FIG. 7 relies in part on screens to retain the confined animals while avoiding the clogging problems heretofore encountered with confinement screens.

In the embodiment of FIG. 7, the culture vessel 12b is also rectangular but the flowing bed of particles 22b is not situated on the floor 18b of the vessel. Instead, the particles 22b flow down a flat partition assembly 102 which slants downward from an inlet compartment 83b at one end of the vessel to an outlet compartment 98b situated just above floor 18b at the opposite end of the vessel. Particle recirculation tubes 99b extend from outlet compartment 98b, below partition assembly 102, to an intermediate level within inlet compartment 83b. Air nozzles 101b direct air flows into the tubes within outlet compartment 98b to pump a slurry of particles, accumulated wastes and water from the outlet compartment back into the inlet compartment where the particles fall to the bottom of the inlet compartment while lighter waste particles are carried upwardly and flow out through drain conduits 87b to a settling tank 23b. Nozzles 101b receive air from a pressurized air source 26b through separate air flow control valves 34b and 36b. In this embodiment, additional aeration of the liquid 13b is provided for through a third air flow control valve 103 and flow line 104 which extends downwardly into the organism region 21b. A continuous inflow of water to the containment region 21b is provided through an inflow line 106 from water supply 24b. As the rate of outflow of water through drain line 87b in this example may be relatively small, owing to the relatively lower porosity of the bed of very minute particles 22b, a series of passages 106 are provided through the partition assembly 102. An outlet fitting 107 is provided in the wall of the vessel 12b below partition assembly 102 to drain additional liquid to settling tank 23b.

To carry the flowing bed of particles 22b over the passages 99b in partition 102 and to block the escape of the organisms through such passages, a fine mesh screen 108 is disposed on the upper surface of the partition below the flowing particles.

Operation of the embodiment of FIG. 7 is in most respects essentially similar to that of the last described embodiment except that the smaller diameter of particles or beads 22b effectively confine nauplii to the containment region 21b by blocking escape through the openings 82b and 51b through which the particles 22b flow out of the inlet compartment 83b and into the outlet compartment 98b as well as blocking escape through the passages 106 in partition 102. It should be observed that the screen 108 is not employed as a primary means for confining the animals to the containment region 21b since the bed of flowing particles 22b performs this function. Rather the screen 108 serves to support the flowing bed of particles 22b over passages 99b which provide for a high flow through of liquid. Screen clogging does not occur since the flowing bed of particles 22b continually scours and cleans the screen as well as removing waste materials which are produced by the confined animals and which drop to the bottom of the containment region.

Numerous other variations in the structure of an aquicultural system may be made while advantageously embodying aspects of the present invention. In general, culturing of aquatic organisms in accordance with aspects of the invention includes the steps of confining the aquatic organisms to a predetermined region in a suitable liquid medium and providing a volume of loose solid particles at a boundary of the region in position to accumulate matter which is to be removed from the region. The removal of the matter is accomplished by causing the volume of particles to flow between a first location and a second spaced apart location and by directing the particles including accumulated matter out of the region at the second location. In the preferred forms of the invention, the accumulated waste matter or the like is removed from the particles at a third location which is outside of the organism containment region and the particles are then returned to the region for repeated movement between the first and second locations.

While the invention has been described with respect to certain specific embodiments, many variations are possible and it is not intended to limit the invention except as defined in the following claims.

I claim:

1. In a method of culturing aquatic organisms which are confined to a predetermined region in a liquid medium and in which a volume of loose solid particles is provided at a boundary of said being in position to accumulate matter which is to be removed from said region, the steps comprising:
   removing said matter from said region by causing said volume of particles to flow between a first location and a second spaced apart location, and by directing the flow of said particles and matter carried thereby out of said region at said second location,
   separating said matter from said particles at a third location which is outside of said region, and
   then returning said particles to said region for repeated movement between said first location and said second location.

2. In a method as defined in claim 1, the step of directing the flow of said particles down an inclined surface situated between said first and second locations.

3. In a method as set forth in claim 2 wherein said inclined surface forms a floor beneath said region and said volume of particles forms a bed at the bottom thereof, the step of utilizing said flow of said particles along said surface to remove waste materials which are produced by said aquatic organisms and which drop to said bottom of said region.

4. In a method as set forth in claim 2 wherein said inclined surface defines a wall of a vessel in which said liquid medium is contained, the step of utilizing said flow of said volume of particles to scour said wall.

5. In a method of culturing aquatic organisms which are confined to a predetermined region in a liquid medium and in which a volume of loose solid particles is provided at a boundary of said region, said volume of loose particles being in position to accumulate matter which is to be removed from said region, the steps comprising:
   removing said matter from said region by causing said volume of particles to flow between a first location and a second spaced apart location, and by directing the flow of said particles and matter carried thereby out of said region at said second location,
   wherein said region is within a vessel having at least one outlet opening below the surface of said liquid medium at said second location through which said particles are directed away from said region, and
   confining said organisms to said region by utilizing said volume of flowing particles to block escape of said organisms through said outlet opening.

6. In a method as defined in claim 5, the further steps of returning particles from said second location to said first location and providing for feeding of said returned particles into said region at said first location at a rate exceeding the rate at which particles are directed out of said region through said opening at said second location.

7. In a method of culturing aquatic organisms which are confined to a predetermined region in a liquid medium and in which a volume of loose solid particles is provided at a boundary of said region, said volume of loose particles being in position to accumulate matter which is to be removed from said region, and wherein a flow of said liquid medium is delivered to said region, the step comprising:
   removing said matter from said region by causing said volume of particles to flow between a first location and a second spaced apart location, and by directing the flow of said particles and matter carried thereby out of said region at said second location, and
   the further step of utilizing at least a portion of said flow of liquid medium to return said particles from said second location to said first location.

8. In aquicultural apparatus having a vessel with internal surfaces defining a region in which aquatic organisms are cultured within a liquid medium, and wherein a volume of loose solid particles is situated on an internal surface in said vessel in position to accumulate material which is to be removed from said region, the improvement comprising:
   flow producing means for causing flowing movement of said volume of particles and accumulated material between a first location in said region and a second spaced apart location, outlet means for directing said particles and accumulated material out of said region at said second location, separator means for separating said accumulated material from said particles, and recirculation means for transmitting particles from said second location to said separator means and then back to said first location.

9. The apparatus of claim 8 wherein at least a portion of said surface between said first and second locations is inclined at an angle exceeding the angle of repose of said loose particles in said liquid medium.

10. The apparatus of claim 8 wherein said surface is on a floor member at the bottom of said region and wherein said flowing volume of particles is a bed on said floor positioned to receive waste materials which are produced by said organisms and which drop to said bottom of said region.

11. The apparatus of claim 8 wherein said surface is on a wall of said vessel whereby said movement of said particles exerts a scouring action on said wall.

12. In aquicultural apparatus having a vessel with internal surfaces defining a region in which aquatic organisms are cultured within a liquid medium, and wherein a volume of loose solid particles is situated on an internal surface in said vessel in position to accumulate material which is to be removed from said region, the improvement comprising:

flow producing means for causing flowing movement of said volume of particles and accumulated material between a first location in said region and a second spaced apart location, outlet means for directing said particles and accumulated material out of said region at said second location, wherein said outlet means includes a particle outlet opening in said vessel at said second location through which said particles and accumulated material flow out of said region, and wherein said flowing volume of loose solid particles has a bulk in the area of said outlet opening which is sufficient to fill said opening and thereby block escape of said organisms from said region.

13. In aquicultural apparatus having a vessel with internal surfaces defining a region in which aquatic organisms are cultured within a liquid medium, and wherein a volume of loose solid particles is situated on an internal surface in said vessel in position to accumulate material which is to be removed from said region, the improvement comprising:

flow producing means for causing flowing movement of said volume of particles and accumulated material between a first location in said region and a second spaced apart location, outlet means for directing said particles and accumulated material out of said region at said second location, particle inlet means for feeding particles into said region at said first location, at least one particle recirculation flow conduit having an intake end positioned to receive particles from said outlet means and having a discharge end communicated with said particle inlet means, and particle recirculation means for directing a flow of fluid into said conduit to pump said particles from said outlet means to said inlet means.

14. The apparatus of claim 13 further including a separator compartment having a particle feed opening located to transmit particles to said first location and having a liquid overflow drain opening situated at an elevation higher than that of said particle feed opening, wherein said discharge end of said recirculation flow conduit is communicated with said separator compartment at an elevation intermediate between that of said particle feed opening and that of said overflow drain opening.

15. The apparatus of claim 13 wherein said flow of fluid which is directed into said recirculation flow conduit by said recirculation means includes a flow of said liquid medium.

16. The apparatus of claim 15 wherein said flow of fluid which is directed into said recirculation flow conduit by said recirculation means further includes a flow of air, said flow of air being sufficient to maintain the pressure at said outlet means lower than the pressure which exists in the portion of said region adjacent said outlet means.

17. Aquicultural apparatus comprising:

a vessel forming a compartment for containing aquatic organisms in a liquid above a bed of loose solid particles, said vessel having a floor at the bottom of said compartment which is inclined at an angle exceeding the angle of repose of said particles in said liquid whereby said bed of particles flows downwardly along said floor, said vessel further having a particle outlet opening located to receive said particles from said flowing bed thereof, particle inlet means for feeding said particles onto said inclined floor at a location which is above said outlet opening and horizontally spaced apart therefrom to maintain said flowing bed of particles, separator means for cleaning accumulated material from said particles, and particle recirculation means for transmitting said particles from said outlet opening to said separator means and then back to said particle inlet means.

18. The apparatus of claim 17 wherein said floor has first and second oppositely inclined surfaces extending in opposite directions from said particle outlet opening, and wherein said particle recirculation means and said particle inlet means deliver a first portion of said particles from said separator means to said first surface of said floor and feeds another portion of said particles from said separator means to said second surface of said floor.

19. The apparatus of claim 17 wherein said vessel has an upwardly extending wall member and wherein said particle inlet means directs said particles down said wall member whereby said particles scour material from said wall member while dropping to said location on said floor.

20. The apparatus of claim 17 wherein said particle inlet means includes a first particle translating device positioned to receive said particles from said particle outlet opening, and wherein said particle inlet means includes a second particle translating device positioned to feed said particles onto said floor at said location, and drive means for operating said first and second particle translating devices at predetermined relative rates of particle translation.

21. The apparatus of claim 17 wherein said vessel includes a first baffle member forming a particle inlet compartment adjacent an upper portion of said floor, said first baffle member being positioned to provide a particle inlet opening at said upper portion of said floor, said vessel further having a second baffle member situated adjacent a lower portion of said floor to form a particle outlet compartment, said second baffle member being positioned to define said particle outlet opening at said lower portion of said floor, and wherein said particle recirculating means includes at least one fluid operated pump connected between said outlet compartment and said inlet compartment.

22. The apparatus of claim 17 wherein said inclined floor forms a subcompartment in said vessel below said organism compartment and has at least one passage communicating said subcompartment with said organism compartment, further including:

a screen extending across said passage of said floor, said screen having openings which are smaller than said particles, means for delivering an inflow of said liquid to said organism compartment, and means for releasing an outflow of said liquid from said subcompartment.

* * * * *

UNITED STATES PATENT AND TRADEMARK OFFICE
CERTIFICATE OF CORRECTION

PATENT NO. : 4,368,691
DATED : January 18, 1983
INVENTOR(S) : David E. Brune

It is certified that error appears in the above—identified patent and that said Letters Patent is hereby corrected as shown below:

Column 13, line 55 (line 4 of claim 1): after "said" insert
--region, said volume of loose particles--

Signed and Sealed this

Nineteenth Day of April 1983

[SEAL]

Attest:

GERALD J. MOSSINGHOFF

Attesting Officer

Commissioner of Patents and Trademarks